Patented Mar. 17, 1925.

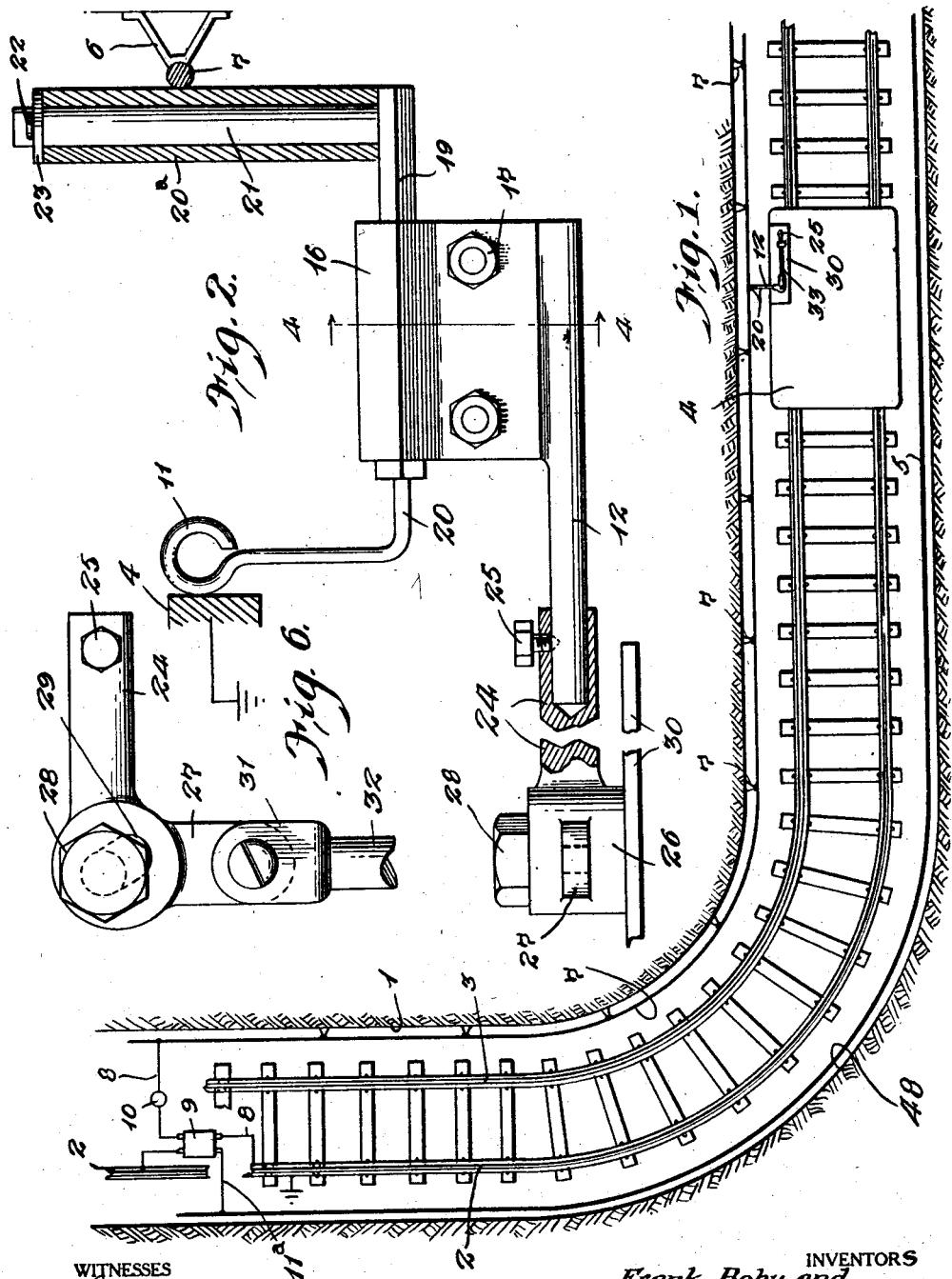

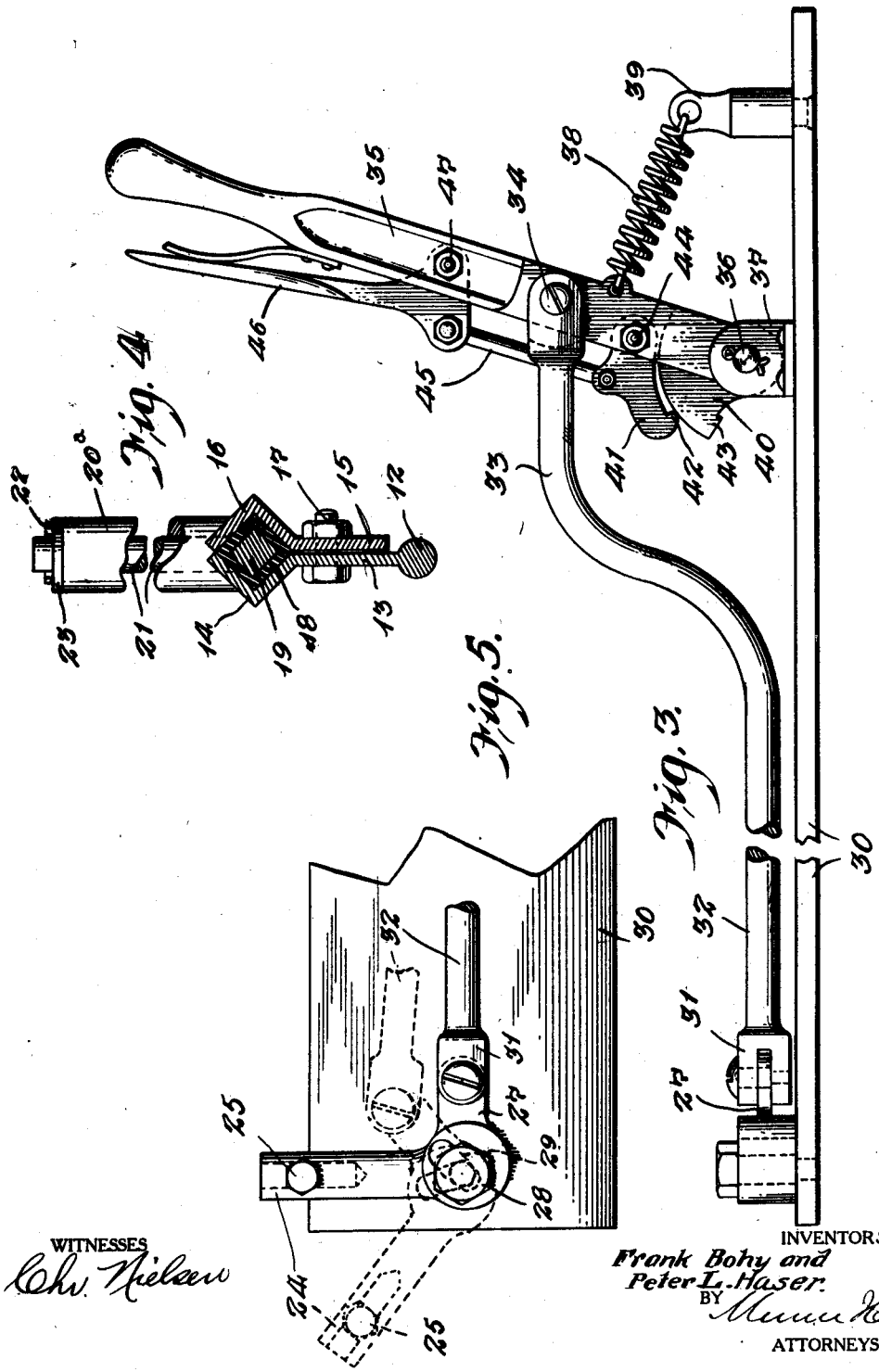

1,529,940

UNITED STATES PATENT OFFICE.

FRANK BOHY AND PETER LOUIS HASER, OF ARNOLD, PENNSYLVANIA.

MINING EQUIPMENT.

Application filed May 26, 1924. Serial No. 716,001.

*To all whom it may concern:*

Be it known that we, FRANK BOHY and PETER LOUIS HASER, citizens of the United States, and residents of Arnold, in the county of Westmoreland and State of Pennsylvania, have invented certain new and useful Improvements in Mining Equipments, of which the following is a specification.

This invention relates to a signaling system on electric lines of any type and more especially is directed to a signalling system for an underground railway in mines.

An object of the invention is the provision of a device for throwing a switch which is adapted to cooperatively engage a wire connected with a signal light and for grounding the wire to complete the circuit.

A further object of the invention is the provision of an oscillatable arm carrying a plurality of contacts which when moved to an outward position from a motor car is adapted to complete the circuit to a signal lamp located in advance of said car, with a contact carried by the arm and adapted to engage a motor and ground the circuit for causing illumination of the signal lamp.

A still further object of the invention is the provision of an operating means for an oscillatable contact arm which is adapted to cause the arm to project laterally from the car and also to be moved interiorly of said car.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 shows more or less diagrammatically a track, car and signalling system of a line.

Figure 2 is a side view of the movable trolley for completing the circuit of the signalling system.

Figure 3 is a side view of the operating mechanism for the movable trolley of the signalling system.

Figure 4 is a section of a supporting bracket taken along the line 4—4 of Figure 2.

Figure 5 is a fragmentary plan view of the operating mechanism for the signalling trolley shown in an inoperative position.

Figure 6 is a fragmentary plan view of the operating mechanism for the signalling trolley shown in an operative position.

Referring more particularly to the drawings, 1 designates the tunnel in a mine upon the floor of which is located the rails 2 and 3 of a track upon which the car 4 is driven by means of an electric motor. An overhead trolley or third rail 5 is adapted to be engaged by the usual trolley pole for car-carying current to the motor of the car 4. Upon the side wall of the tunnel is secured, by insulating members 6, a wire 7 which is adapted to be thrown in circuit with a secondary wire 8 of a transformer 9. The lamp 10, fixed to the roof of the tunnel, is placed in series with the secondary wire of said transformer. A primary wire 11a of the transformer is connected with the trolley wire 5 and the rail 2 for completing the circuit.

The secondary winding is grounded on the rail 2 and has its other end connected with the wire 7. The current from the secondary circuit through wire 7, and a movable contact 11 carried by the bracket arm 12 adapted to engage a stationary contact on the car 4 for completing the circuit of the conduit causes illumination of the signal lamp 10. The transformer 9 steps down the current from wire 5 for giving the proper voltage for lighting lamp 10 without injuring the same.

The bracket 12, as shown more particularly in Figure 4, has a rectangular extension 13 in which is formed an angular groove 14 at its upper free end. A plate 15 having a cooperating angular groove 16 is adapted to be secured to the plate 13 by means of a bolt 17. The cooperating angular portions 14 and 16 receive an insulating member 18 through which is inserted a rod 19 square in cross section. The rod 19 forms a conductor between the vertically disposed roller 20ª, its axle 21, wire 7 and contact 11. A cotter pin 22 and washer 23 maintain the roller 20ª on the axle 21. Connected to the bar 19 is a horizontal arm 20 having a vertically disposed right angular extension carrying the contact 11.

The inner end of the bracket or arm 12 is adapted to be received within a socket in an arm 24 and secured thereto by means of a set screw 25. The arm 24 has a hub 26. The hub 26 of the arm 24 is provided with and arm 27 located at a right angle to arm 24 and an elongated slot 29 which receives a bolt 28 secured to a base plate 30 upon which slides the hub 26 of the bell crank lever composed of the arms 24 and 27.

The outer end of the arm 27 is adapted to be received within a bifurcated portion 31 of an operating rod 32. The bifurcated portion 31 is bolted to the arm 27 to form a pivotal point between the rod 32 and said arm. The rod 32 is extended rearwardly and bent upwardly, as shown at 33 and pivotally connected at 34 to an operating lever 35. The lever is mounted for oscillation on a shaft 36 journaled in ears 37 mounted upon the base plate 30. The lever is maintained in an inclined position by means of a spring 38 having one end secured to the lever and the other end to a lug 39 on the base plate 30. An arcuate shaped keeper 40 is made rigid in position and over which is adapted to ride a pawl 41 having a toe 42 for engaging the edge of the keeper 40 and for locking the lever 35 in a rigid position against the tension of the spring 38.

Pawl 41 is pivoted at 44 to the lever 35 and is connected by a link 45 to a spring pressed operating member 46 pivotally connected at 47 to the lever 35.

The operation of our device is as follows:
As the car 4 approaches a curve 48 of the tunnel 1 the lever 46 is depressed for releasing the pawl 41 from the keeper 40. Lever 35 is manually moved to the right. The spring 38 will tend to pull the lever rearwardly. Rearward movement of lever 35 causes arm 27, shown in dotted lines in Figure 5 as located at an angle to the longitudinal edge of base 30, to be disposed longitudinally of the base plate 30. Since arm 27, with arm 24, form a bell crank lever, the arm 24 will be moved from the dotted line position to full lines whereby the bracket arm 12 will be swung laterally from the car 4 and cause the roller 20 to engage the wire 7.

The contact member 11 is adapted to engage a fixed contact on the car 4 when arm 24 is extended laterally from the car for closing the secondary circuit 8 and illuminating the lamp 10. After the curve has been passed the arm 35 is again moved forwardly or to the left in Figure 3 against the tension of the spring 38 until the pawl 41 locks with the keeper 40 and the bell crank lever is shifted forwardly with the bolt 28 riding in the slot 29 and for causing the arm 27 to be gradually moved at an angle to its longitudinal position shown in Figure 5 or moved to the dotted line position shown in this figure. This causes the arm 24 to be moved inwardly and the contact roller 20ª is moved away from the wires 7 and breaks the circuit.

What we claim is:

1. In a signalling system for motor cars in tunnels comprising in combination a motor car, a lamp in open circuit disposed adjacent the curve in the track, a wire extending along the track for the motor car, an extensible arm on the car provided with a pair of spaced contacts, one of the contacts being adapted to engage the wire when the arm is extended, the other contact adapted to be grounded on the car for closing the circuit to the lamp, and means for extending the arm from the car.

2. In a signalling system for motor cars in tunnels comprising in combination a motor car, a lamp disposed adjacent a curve in the track and connected with an open electric circuit, a wire extending along the track for the motor car, an arm normally located within the motor car, means for extending the arm laterally from the car, said arm being provided with a pair of spaced contacts electrically connected, one of said contacts adapted to engage the wire when the arm is extended, the other contact adapted to be grounded on the car for closing the circuit to the lamp, and means for swinging the arm laterally from the car for causing the contact to engage the wire.

3. In a signalling system for motor cars in tunnels, a motor car having a swingable arm adapted to be projected laterally from the car, a rod carried by the arm and insulated therefrom, an axle on the arm, a roller on the axle adapted to engage a wire forming part of the circuit of a lamp, said rod being provided with a second contact adapted to engage a ground on the car when the arm is extended, and means for extending said arm.

4. In a signalling system for motor cars in tunnels a motor car having a swingable arm adapted to be projected laterally from the car, a rod carried by the arm and insulated therefrom, an axle on the arm, a roller on the axle adapted to engage a wire forming part of the circuit of a lamp, said rod being provided with a second contact adapted to engage a ground on the car when the arm is extended, and means for extending said arm, said axle being vertically disposed, the rod having a vertical extension and carrying a second contact.

5. In a signalling system for motor cars in tunnels, a motor car, an arm adapted to be formed laterally from the car, a pair of spaced contacts electrically connected mounted at the free end of the arm, a bell crank lever pivotally mounted on the car, said extensible arm being connected with one of the arms of the bell crank lever, said bell crank lever being provided with a slot, a bolt passing through the slot for connecting the lever to the car, and means for shifting the bell crank lever longitudinally of the car through the slot and bolt, said slot being inclined at an angle to the longitudinal axis of one of the arms of the bell crank lever whereby said lever is caused to be rocked during longitudinal shifting.

6. In a signalling system for motor cars in tunnels, a car, a bell crank lever pivotally mounted on the car and adapted to be oscillated on its pivot for lateral extension from the car, a bracket connected with one arm of the bell crank lever and provided with a pair of spaced contacts electrically connected, means for extending said bracket laterally from the car, said means comprising a rod pivotally connected to the other free arm of the bell crank lever, an operating lever for said rod, a spring for maintaining the arm in normal position, a pawl pivotally mounted on the lever, a catch rigidly connected with the car, and adapted to be engaged by the pawl for locking the arm in another position, an operating lever for the pawl pivotally mounted on the first mentioned lever, and a link connecting the second lever with the pawl.

FRANK BOHY.
PETER LOUIS HASER.